(12) United States Patent
Gerhart et al.

(10) Patent No.: US 9,959,068 B2
(45) Date of Patent: May 1, 2018

(54) INTELLIGENT WIDE PORT PHY USAGE

(71) Applicant: Western Digital Technologies, Inc., Irvine, CA (US)

(72) Inventors: Darin Edward Gerhart, Oronoco, MN (US); Nicholas Edward Ortmeier, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 60 days.

(21) Appl. No.: 15/061,768

(22) Filed: Mar. 4, 2016

(65) Prior Publication Data

US 2017/0255414 A1 Sep. 7, 2017

(51) Int. Cl.
*G06F 1/32* (2006.01)
*G06F 3/06* (2006.01)

(52) U.S. Cl.
CPC .......... *G06F 3/0634* (2013.01); *G06F 3/0625* (2013.01); *G06F 3/0673* (2013.01)

(58) Field of Classification Search
CPC ............................ G06F 13/4286; G06F 3/0625
See application file for complete search history.

(56) References Cited

U.S. PATENT DOCUMENTS

| 7,673,185 | B2 | 3/2010 | Kalwitz et al. |
| 8,843,666 | B2 | 9/2014 | Besmer et al. |
| 8,924,751 | B2 | 12/2014 | Myrah et al. |
| 8,959,374 | B2 | 2/2015 | Miller et al. |
| 2007/0028062 | A1 | 2/2007 | Radhakrishnan et al. |
| 2007/0093124 | A1 | 4/2007 | Varney et al. |
| 2012/0324146 | A1 | 12/2012 | Marks et al. |
| 2016/0239458 | A1* | 8/2016 | Varchavtchik ...... G06F 13/4286 |

* cited by examiner

*Primary Examiner* — Albert Wang
(74) *Attorney, Agent, or Firm* — Patterson + Sheridan, LLP

(57) ABSTRACT

A controller of a storage device is described for handling communications with a host device. In some examples, the storage device includes a wide port comprising a plurality of phys. The wide port is configured to receive, via a first phy of the plurality of phys, a signal. The controller is configured to select, based on a respective power factor associated with each respective phy of the plurality of phys and a respective performance factor associated with each respective phy of the plurality of phys, a second phy of the plurality of phys to utilize for performing an operation associated with the received signal. In such examples, the wide port is further configured to perform, using the second phy, the operation associated with the received signal.

20 Claims, 5 Drawing Sheets

INTELLIGENT WIDE PORT PHY USAGE

TECHNICAL FIELD

The disclosure relates to communication between host devices and storage devices.

BACKGROUND

In computing, host computing devices may communicate with associated storage devices through a port on the storage device. The port may include one or more physical layers (referred to simply as "phys") that refer to circuitry required to implement physical layer functions. With storage devices utilizing a SAS Interface, narrow ports are defined to be ports consisting of only a single phy, while wide ports are defined as ports consisting of two or more phys. For instance, a phy may physically receive or physically couple to a link layer device, such as an optical fiber or copper cable, and perform various functions on various signals received from the link layer devices for the port. As processors become faster and more data is transferred, ports have incorporated more phys to handle the various incoming signals. For instance, wide port configurations utilize two or more phys in a single port. In some wide port examples with multiple phys where an incoming signal requires an operation to be performed, storage devices merely default to performing the operation via the same phy at which the incoming signal was received.

SUMMARY

In one example, the disclosure is directed to a method including receiving, at a wide port of a storage device, via a first phy of a plurality of phys associated the wide port, a signal, selecting, by a controller of the storage device, based on a respective power factor associated with each respective phy of the plurality of phys and a respective performance factor associated with each respective phy of the plurality of phys, a second phy of the plurality of phys to utilize for perforating an operation associated with the received signal, and performing, by the wide port, using the second phy, the operation associated with the received signal.

In another example, the disclosure is directed to a storage device including a wide port comprising a plurality of phys, wherein the wide port is configured to: receive, via a first phy of the plurality of phys, a signal; and a controller configured to: select, based on a respective power factor associated with each respective phy of the plurality of phys and a respective performance factor associated with each respective phy of the plurality of phys, a second phy of the plurality of phys to utilize for performing an operation associated with the received signal, wherein the wide port is further configured to perform, using the second phy, the operation associated with the received signal.

In another example, the disclosure is directed to a computer-readable medium containing instructions that, when executed, cause a controller of a storage device to, responsive to receiving, at a wide port of a storage device, via a first phy of a plurality of phys associated the wide port, a signal: for each phy of the plurality of phys: determine a power mode for the respective phy; determine, based on the power mode, a power value for the respective phy; and multiply the power value with a scaled percentage of the respective power value associated with the respective phy to determine a power factor associated with the respective phy; determining, by the controller, an initiator response factor for the respective phy, wherein the initiator response factor indicates a level of an initiator time turnaround for the respective phy; determine a phy availability time factor for the respective phy, wherein the phy availability time factor indicates a level of time for the respective phy to become available to process a new operation based on the expected processing times of pending operations in a queue to be processed by the respective phy; determine a wake-up time factor for the respective phy, wherein the wake-up time factor indicates a level of time for the respective phy to switch to an active power mode; determine, based on the initiator response factor for the respective phy, the phy availability time factor for the respective phy, the wake-up time factor for the respective phy, and a respective weight for each of the initiator response factor, the phy availability time factor, and the wake-up time factor, a respective performance value for the respective phy; and multiply the respective performance value with a scaled percentage of the performance value to determine a performance factor associated with the respective phy; select, based on the respective power factor associated with each respective phy of the plurality of phys and the respective performance factor associated with each respective phy of the plurality of phys, a second phy of the plurality of phys to utilize for performing an operation associated with the received signal; and perform, using the second phy, the operation associated with the received signal.

The details of one or more examples of the disclosure are set forth in the accompanying drawings and the description below. Other features, objects, and advantages of the disclosure will be apparent from the description and drawings, and from the claims.

DETAILED DESCRIPTION

In general, this disclosure describes techniques for enabling a controller of a storage device to improve the handling of outgoing communications to a host device. For example, a wide port that includes a plurality of phys may receive a signal via one of the phys. In the example where the received signal is associated with an operation, such as a data transfer, rather than defaulting to performing the operation using the same phy that received the signal or arbitrarily selecting a phy to perform the operation, the controller of the storage device may select or determine a phy for performing the operation based on one or more criteria.

The controller may determine the phy by calculating a power factor and/or a performance factor for each respective phy. For instance, if the storage device is configured for power efficiency, the controller may weigh the power factor for each respective phy over the performance factor for each respective phy when determining which phy to utilize in performing the operation. In other instances, if the storage device is configured for performance efficiency, the controller may weigh the performance factor for each respective phy over the power factor for each respective phy when determining which phy to utilize in performing the operation. In still other instances, if the storage device is configured to balance the power efficiency and the performance efficiency, the controller may scale the power factors and the performance factors associated with each of the respective phys such that both factors influence the selection of a phy for performing the operation.

Using the techniques of the current disclosure, a storage device may intelligently and efficiently operate under any combination of performance and power criteria independently of any host device operatively connected to the storage device. Further, the storage device may alter performance and power criteria based on the desired environment, without the host device needing to be aware of such changes to the performance and power criteria, e.g., thereby increasing the independence of the storage device, reducing complexity at the host device, and the like.

Figure 1:
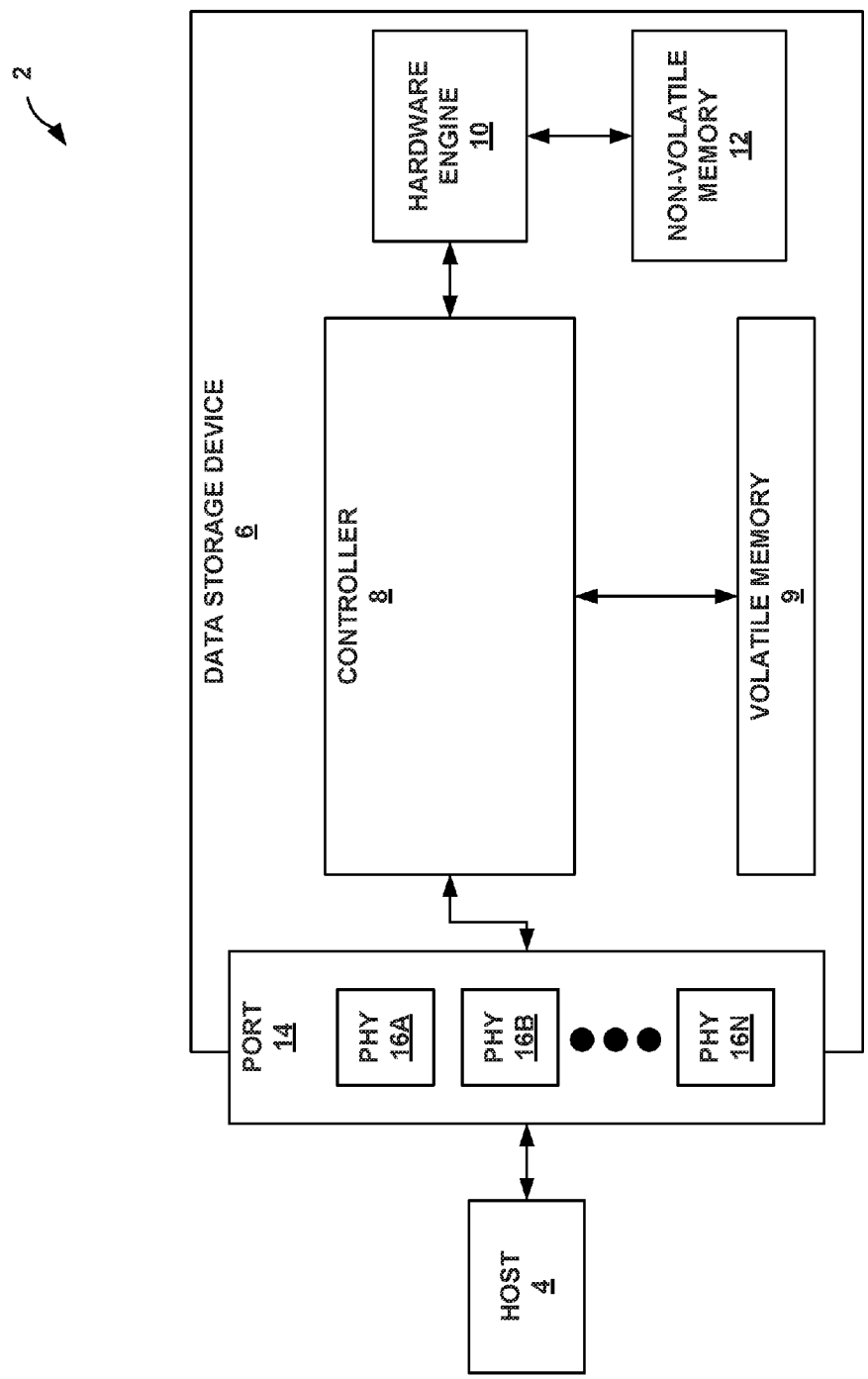
FIG. 1 is a conceptual diagram illustrating an example system configured as a storage environment in which a hard drive may function as a storage device for a host device, in accordance with one or more techniques of this disclosure.

FIG. 1 is a conceptual and schematic block diagram illustrating an example system 2 configured as a storage environment in which a hard drive may function as a storage device 6 for a host device 4, in accordance with one or more techniques of this disclosure. For instance, host device 4 may utilize non-volatile memory devices included in data storage device 6, such as non-volatile memory (NVM) 12, to store and retrieve data. In some examples, storage environment 2 may include a plurality of storage devices, such as data storage device 6, which may operate as a storage array. For instance, storage environment 2 may include a plurality of hard drives 6 configured as a redundant array of inexpensive/independent disks (RAID) that collectively function as a mass storage device for host device 4. While techniques of this disclosure generally refer to storage environment 2 and data storage device 6, techniques described herein may be performed in any storage environment that utilizes a SAS Interface and non-volatile memory to store data, such as a solid state drive (SSD) or a tape drive.

Storage environment 2 may include host device 4 which may store and/or retrieve data to and/or from one or more storage devices, such as data storage device 6. As illustrated in FIG. 1, host device 4 may communicate with data storage device 6 via port 14. Host device 4 may include any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, and the like. Typically, host device 4 includes any device having a processing unit, which may refer to any form of hardware capable of processing data and may include a general purpose processing unit (such as a central processing unit (CPU), dedicated hardware (such as an application specific integrated circuit (ASIC)), configurable hardware such as a field programmable gate array (FPGA) or any other form of processing unit configured by way of software instructions, microcode, firmware, or the like.

As illustrated in FIG. 1 data storage device 6 may include a controller 8, a volatile memory 9, a hardware engine 10, NVM 12, and port 14. In some examples, data storage device 6 may include additional components not shown in FIG. 1 for ease of illustration purposes. For example, data storage device 6 may include power delivery components, including, for example, a capacitor, super capacitor, or battery; a printed circuit board (PCB) to which components of data storage device 6 are mechanically attached and which includes electrically conductive traces that electrically interconnect components of data storage device 6, and the like. In some examples, the physical dimensions and connector configurations of data storage device 6 may conform to one or more standard form factors. Some example standard form factors include, but are not limited to, 3.5" hard disk drive (HDD) or solid state drive (SSD), 2.5" HDD or SSD, or 1.8" HDD or SSD.

In some examples, volatile memory 9 may store information for processing during operation of data storage device 6. In some examples, volatile memory 9 is a temporary memory, meaning that a primary purpose of volatile memory 9 is not long-term storage. Volatile memory 9 on data storage device 6 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

In some examples, data storage device 6 may be a shingle magnetic recording (SMR) drive. With SMR, tracks are written to NVM 12 and successively written data tracks partially overlap the previously written data tracks, which typically increases the data density of NVM 12 by packing the tracks closer together. In some examples in which data storage device 6 is an SMR drive, data storage device 6 may also include portions of NVM 12 that do not include partially overlapping data tracks and are thus configured to facilitate random writing and reading of data. To accommodate the random access zones, portions of NVM 12 may have tracks spaced farther apart than in the sequential, SMR zone.

NVM 12 may be configured to store larger amounts of information than volatile memory 9. NVM 12 may further be configured for long-term storage of information as non-volatile memory space and retain information after power on/off cycles. Examples of non-volatile memories include magnetic media, NAND, optical disks, floppy disks, flash memories, or forms of electrically programmable read only memories (EPROM) or electrically erasable programmable read only memories (EEPROM). NVM 12 may be one or more magnetic platters in data storage device 6, each platter containing one or more regions of one or more tracks of data.

Data storage device 6 may include port 14 for interfacing with host device 4. Port 14 may include one or both of a data bus for exchanging data with host device 4 and a control bus for exchanging operations with host device 4. Port 14 may include multiple independent physical connections with host device 4, also known as phys 16A-16N. In some examples, port 14 may include as few as 2 phys 16A and 16B. In other examples, port 14 may include four phys 16A-16D. In still other examples, port 14 may include more than four phys. Port 14 may operate in accordance with any suitable protocol. For example, port 14 and phys 16A-16N may operate in accordance with one or more of the following protocols:

advanced technology attachment (ATA) (e.g., serial-ATA (SATA), and parallel-ATA (PATA)), Fibre Channel, small computer system interface (SCSI), serially attached SCSI (SAS), peripheral component interconnect (PCI), PCI-express (PCIe), and non-volatile memory express (NVMe). In the following examples, port 14 may have a wide port configuration and operate in accordance with the SAS protocol. Phys 16A-16N is electrically connected to controller 8, providing electrical connection between host device 4 and controller 8, allowing data to be exchanged between host device 4 and controller 8. In some examples, the electrical connection of port 14 may also permit data storage device 6 to receive power from host device 4. The one or more phys 16A-16N, or physical layers that refer to circuitry required to implement physical layer functions. For instance, phys 16A-16N may physically receive a link layer device, such as an optical fiber or copper cable, and perform various functions on the signals received from the link layer devices for port 14. Phys 16A-16N may be configured to operate under one or more of the following protocols: ATA, SATA, universal serial bus (USB), wireless local access network (WLAN), Ethernet, SAS, PCI, PCIe, and NVMe.

In the example of FIG. 1, data storage device 6 includes hardware engine 10, which may represent the hardware responsible for interfacing with the NVM 12. Hardware engine 10 may, in the context of a platter-based hard drive such as an SMR drive, represent the magnetic read/write head and the accompanying hardware to configure, drive, and process the signals sensed by the magnetic read/write head. In other examples, such as when data storage device 6 is an SSD or other instances of an HDD, hardware engine 10 may refer to logic engines controlling read and write operations to NVM 12. In such examples, hardware engine 10 may be a sub-component of controller 8.

Data storage device 6 includes controller 8, which may manage one or more operations of data storage device 6. Controller 8 may interface with host device 4 via port 14 and manage the storage of data to and the retrieval of data from NVM 12 accessible via hardware engine 10. Controller 8 may, as one example, manage writes to and reads from the memory devices, e.g., volatile memory 9 and NVM 12. In some examples, controller 8 may be a hardware controller. In other examples, controller 8 may be implemented into data storage device 6 as a software controller. Controller 8 may include any combination of software, hardware, and/or firmware to perform techniques of this disclosure.

Data storage device 6 may execute software, such as the above noted operating system, to manage interactions between host 4 and hardware engine 10. The operating system may perform arbitration in the context of multi-core CPUs, where each core effectively represents a different CPU, to determine which of the CPUs may access hardware engine 10. The operating system may also perform queue management within the context of a single CPU to address how various events, such as read and write requests in the example of data storage device 6, issued by host 4 should be processed by hardware engine 10 of data storage device 6.

In accordance with the techniques of this disclosure, port 14 may be configured to receive, via phy 16A, a signal. In some examples, the signal may include or be associated with an operation to be performed by one of phys 16A-16N. In the example of FIG. 1, phy 16A may receive a signal from host 4 that includes a request to conduct a data transfer between data storage device 6 and host 4. Other examples of the signal received at phy 16A may include a signal that includes data to be written at data storage device 6 or a signal that includes an address of data to be read from data storage device 6, among other things. Examples of operations that may be performed by one of phys 16A-16N include a write operation, a read operation, a data transfer, or a data deletion, among other things.

For SAS Wide Port Configurations of plurality of phys 16A-16N, responsive to phy 16A receiving the signal, controller 8 may select, based on a respective power factor associated with each respective phy of the plurality of phys 16A-16N and/or a respective performance factor associated with each respective phy of the plurality of phys 16A-16N, a second phy of the plurality of phys to utilize for performing an operation associated with the received signal. In the example of FIG. 1, phy 16A may receive a signal indicative of an operation to perform a data transfer between data storage device 6 and host 4. In response to receiving the signal, one phy of the phys 16A-16N may perform that operation. However, due to previously queued operations and power states of the various phys 16A-16N, the operation may be performed more efficiently on some phys of the plurality of phys 16A-16N than others. Further, based on the environment in which data storage device 6 is performing in, controller 8 may be configured to operate at a specific level of power efficiency and/or a specific level of performance efficiency. These levels may influence the values of the respective power factors and the respective performance factors used by controller 8 to select each of the one or more phys 16 being used to carry out an operation.

For instance, if data storage device 6 is configured to be a low-power storage device, controller 8 may select the second phy 16 based on which phy 16 would require the least amount of power consumption to execute the operation indicated by the received signal. In another instance, if data storage device 6 is configured to operate in a high-traffic environment, controller 8 may select the second phy 16 based on which phy 16 would complete the operation the quickest or in the shortest amount of time. In still other instances, controller 8 may select the phy 16 based on a combination of the power consumption and the performance efficiency. In the example of FIG. 1, controller 8 may select phy 16B to perform the data transfer included in the received signal, based on the respective power factor and the respective performance factor of phy 16B indicating that phy 16B was the phy for performing the operation under the current configuration of data storage device 6.

Once controller 8 selects second phy 16B to perform the operation, port 14 may perform, using second phy 16B, the operation associated with the received signal. In the example of FIG. 1, phy 16B may perform the operation of conducting the data transfer indicated in the signal received by phy 16A.

By using the techniques described herein, data storage device 6 may intelligently decide which phy of phys 16A-16N to utilize in performing operations based on the environment in which data storage device 6 is configured to operate. As host device 4 may be generally unaware of operations being performed on data storage device 6 without querying data storage device 6, host device 4 may arbitrarily determine which phy of phys 16A-16N to utilize in sending a signal indicative of an operation to be performed to data storage device 6. If the same phy is consistently used when data storage device 6 is configured for performance, performing all operations using the same phy may result in a large loss in performance, as other phys may not execute any operations while the single phy executes each operation. In other instances, if the phy used by host device 4 to send operations to data storage device 6 is rotated when data storage device 6 is configured for power efficiency, performing each operation at the phy which the operation was received may result in power inefficiencies and performance delays based on the phys consistently being activated out of slumber mode and being switched back into slumber mode after the operation is executed. Further, if data storage device 6 was required to switch environments, the previous techniques may not allow data storage device 6 to effectively make such a switch. Using the techniques of the current disclosure, data storage device 6 may intelligently and efficiently operate under any combination of performance and power factors independently of host device 4. Further, data storage device 6 may alter performance and power levels based on the desired environment without host device 4 needing to be aware of such changes, increasing the independence of data storage device 6.

Figure 2:
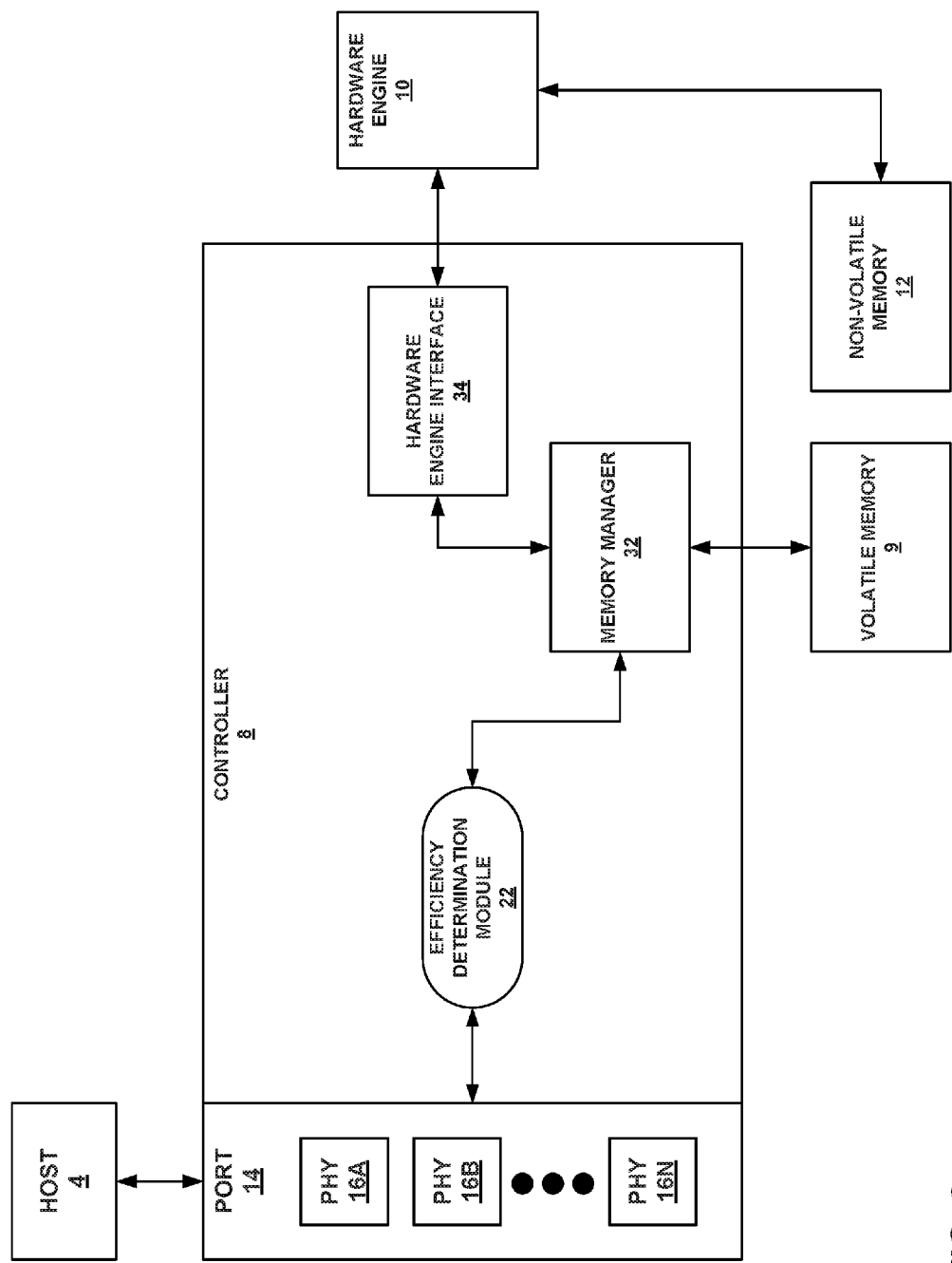
FIG. 2 is a conceptual diagram illustrating the controller and other components of the hard drive of FIG. 1 in more detail.

FIG. 2 is a block diagram illustrating controller 8 and other components of data storage device 6 of FIG. 1 in more detail. In the example of FIG. 2, controller 8 includes port 14, efficiency determination module 22, memory manager unit 32, and hardware engine interface unit 34. Memory manager unit 32 and hardware engine interface unit 34 may perform various functions typical of a controller on a hard drive. For instance, hardware engine interface unit 34 may represent a unit configured to facilitate communications between the hardware controller 8 and the hardware engine 10. Hardware engine interface unit 34 may present a standardized or uniform way by which to interface with hardware engine 10. Hardware engine interface 34 may provide various configuration data and events to hardware engine 10, which may then process the event in accordance with the configuration data, returning various different types of information depending on the event. In the context of an event requesting that data be read (e.g., a read request), hardware engine 10 may return the data to hardware engine interface 34, which may pass the data to memory manager unit 32. Memory manager unit 32 may store the read data to volatile memory 9 and return a pointer or other indication of where this read data is stored to hardware engine interface 34. In the context of an event involving a request to write data (e.g. a write request), hardware engine 10 may return an indication that the write has completed to hardware engine interface unit 34. In this respect, hardware engine interface unit 34 may provide a protocol and handshake mechanism with which to interface with hardware engine 10.

Controller 8 includes various modules, including efficiency determination module 22. The various modules of controller 8 may be configured to perform various techniques of this disclosure, including the technique described above with respect to FIG. 1. Efficiency determination module 22 may perform operations described herein using software, hardware, firmware, or a mixture of hardware, software, and firmware residing in and/or executing on data storage device 6 (e.g., at volatile memory 9 and/or non-volatile memory 12).

In accordance with the techniques of this disclosure, port 14 may be configured to receive, via phy 16A, a signal. In some examples, the signal may include or be associated with an operation to be performed by one of phys 16A-16N. In the example of FIG. 2, phy 16A may receive a signal from host 4 for a request to write data to non-volatile memory 12. Examples of the signal include a signal that includes data for writing or a signal that includes an address of data for reading, among other things. Other examples of operations that may be performed by one of phys 16A-16N include a write operation, a read operation, a data transfer, or a data deletion, among other things.

Responsive to phy 16A receiving the signal, efficiency determination module 22 of controller 8 may select, based on a respective power factor associated with each respective phy of the plurality of phys 16A-16N and a respective performance factor associated with each respective phy of the plurality of phys 16A-16N, a second phy of the plurality of phys to utilize for performing an operation associated with the received signal. For instance, volatile memory 9 may store a data structure, such as a table, a machine learning system, a database, or the like. This data structure may store each of the determined power factors and the determined performance factors. Efficiency determination module 22 may update the respective power factors and the respective performance factors for each respective phy intermittently or upon receipt of every signal from host 4. Efficiency determination module 22 may then select the second phy based on the values of the respective power factors and the respective performance factors in the data structure in volatile memory 9.

In the example of FIG. 2, phy 16A received a signal indicative of an operation to write data to non-volatile memory 12. As such, one phy of the phys 16A-16N may perform that operation. However, due to previously queued operations and power states of the various phys 16A-16N, the operation may more efficiently be performed on some phys of the plurality of phys 16A-16N than others. Further, based on the environment in which data storage device 6 is performing in, controller 8 may be configured to operate under various levels of power efficiency and performance efficiency. These levels may influence the values of the respective power factors and the respective performance factors.

For instance, if data storage device 6 is configured to be a low-power storage device, efficiency determination module 22 of controller 8 may select the second phy as the phy that would require the least amount of power consumption to execute the operation indicated by the received signal, as indicated by the respective power factors stored in the data structure in volatile memory 9 maintained by controller 8. In another instance, if data storage device 6 is configured to operate in a high-traffic environment, efficiency determination module 22 of controller 8 may select the second phy as the phy that would complete the operation the quickest, as indicated by the respective performance factors stored in the data structure in volatile memory 9 maintained by controller 8. In still other instances, efficiency determination module 22 of controller 8 may select the phy based on a combination of the power consumption and the performance efficiency, as indicated by both the respective power factors and the respective performance factors stored in the data structure in volatile memory 9 maintained by controller 8. In the example of FIG. 2, efficiency determination module 22 of controller 8 may select phy 16B to perform the write operation included in the received signal, based on the respective power factor and the respective performance factor of phy 16B indicating that phy 16B was the phy for performing the operation under the current configuration of data storage device 6.

In some examples, the respective power factors maintained by module 22 may indicate an inverse level of power consumption needed to perform the operation using each individual phy. The respective power factor may be a scaled percentage of a respective power value associated with each respective phy of the plurality of phys. In determining the respective power factor for each respective phy 16A-16N, efficiency determination module 22 of controller 8 may determine a power mode for the respective phy. In some examples, the power mode may be one of an active mode, a slumber mode, or a partial power mode. For instance, if phy 16A is in an active mode, phy 16A may be powered to actively receive signals and perform the operations included in the signals. In other instances, if phy 16A is in slumber mode, phy 16A may neither receive signals from the host device nor perform operations and requires a first wake-up time duration to be transitioned to the active mode. In still other instances, if phy 16A is in partial power mode, phy 16A may neither receive signals from the host device nor perform operations and that the respective phy requires a second wake-up time duration to be transitioned to the active mode, wherein the second wake-up time duration is less than the first wake-up time duration. For example, a phy in slumber mode or partial power mode may only be able to receive signals from controller 8 that indicate that the respective phy should transition to active mode. The time duration that the transition takes, in addition to the power needed to make such a transition, may take a longer time and require more power when the phy is in slumber mode rather than partial power mode. As a tradeoff, a phy in slumber mode may consume less power than a phy in partial power mode. In other examples, other power modes may exist, with each power mode supplying different amounts of power to the respective phy.

In other words, in order for phy 16A to be switched to an active mode such that phy 16A is capable of performing operations, different amounts of power may be required. For instance, if phy 16A is already in active mode, a minimal amount of power may be needed to switch phy 16A into a state where phy 16A may perform the operation indicated by the received signal. Conversely, if phy 16A is in slumber mode and receiving a very low amount of power, a larger amount of power may be needed to switch phy 16A into a state where phy 16A may perform the operation indicated by the received signal.

Based on the power mode for the respective phy, efficiency determination module 22 may determine a power value for the respective phy. For instance, since the power factor indicates an inverse level of power consumption needed to perform the operation using the respective phy, larger power values may be assigned to phys with power modes that require less power consumption to perform the operation. As such, efficiency determination module 22 may assign phys in active mode a high value (e.g., one), phys in slumber mode a low value (e.g., zero), and phys in a partial power mode a middle value (e.g., zero<power value<one).

Efficiency determination module 22 may then multiply the power value with the scaled percentage of the respective power value associated with the respective phy to determine the power factor associated with the respective phy. As described above, the respective power factor may be a scaled percentage of a respective power value associated with each respective phy of the plurality of phys. The scaled percentage of the respective power value may indicate the weight that efficiency determination module 22 places on the power factor in evaluating which phy to select for performing the operation. For instance, if the scaled percentage of the power factor is equal to one hundred percent, efficiency determination module 22 may always select the phy that would consume the least amount of power in performing the operation, i.e., the phy with the largest power factor. In such instances, only a single phy may be in active mode, with all signals being received by the single active phy and all operations being performed by the single active phy. In other instances, the scaled percentage of the power value may be less than one hundred percent, enabling efficiency determination module 22 to use a combination of the power factor and the performance factor in selecting the phy for performing the operation.

In some examples, the respective performance factors maintained by module 22 indicate a relative amount of time needed to perform the operation using each individual phy. The respective performance factor may include a scaled percentage of a respective performance value associated with each respective phy of the plurality of phys. In determining the respective performance factor for each respective phy 16A-16N, efficiency determination module 22 of controller 8 may determine an initiator response factor for the respective phy. The initiator response factor may indicate a level of an initiator time turnaround for the respective phy, which may be based on an internal response histogram. Using command latency monitoring hardware, firmware in controller 8 may maintain active response time histograms for each initiator on each phy. Separate statistics are maintained for read and write directions. For reads, a histogram may track time from the first open request to the credit granted. For writes, a histogram may track time from the open request for a transfer ready frame to host 4 returning a first write data frame. The respective histograms may be determined from running short-term statistics of the last n quantity of commands of the same type (e.g., n being 100,000 or any other integer). As such, the initiator response factor may be a value from zero to one based on a probability of being in the specific histogram grouping where one is a grouping with the lowest response times and zero is a grouping with the largest response times.

Efficiency determination module 22 of controller 8 may then determine a phy availability time factor for the respective phy. The phy availability time factor may indicate a level of time for the respective phy to become available to process a new operation based on the expected processing times of pending operations in a queue to be processed by the respective phy. Using, the command latency monitoring techniques (which in some examples may be implemented in hardware), controller 8 may maintain (e.g., within firmware) command response time statistics. Efficiency determination module 22 may calculate an expected time before each phy would be available to service a new command by summing the expected completion time for all pending commands in each phy's queue based on the individual command lengths and internal response time statistics. As such, the phy availability factor may be a value from zero to one based on the total expected time until the respective phy would be available for performing the new operation, where 0 is worst case time (e.g. >25 ms) and 1 is best case where the respective phy is immediately available (e.g. no pending operations).

Efficiency determination module 22 of controller 8 may then determine a wake-up time factor for the respective phy. The wake-up time factor may indicate a level of time for the respective phy to switch to an active power mode, similar to the power factor. The phy wake-up time factor may be a value from zero to one, where one means the phy is already active (i.e., no wake-up delay), zero means the phy is in slumber mode (i.e., the worst case wake-up delay), and a relative value based on wake-up time between 0 and 1 for a phy in a partial power mode.

Efficiency determination module 22 of controller 8 may determine the respective performance value for the respective phy based on the initiator response factor for the respective phy, the phy availability time factor for the respective phy, the wake-up time factor for the respective phy, and a respective weight for each of the initiator response factor, the phy availability time factor and the phy wake-up time factor. Each of the initiator response factor, the phy availability time factor, and the wake-up time factor may influence the performance of the phy in various ways. As such, different implementations may assign different weights to each of the factors. In some examples, each factor may have an equal weight (e.g., thirty three percent). In other examples, the factors may have different weights (e.g., the initiator response factor weight may be fifty percent, the phy availability time factor may be twenty-five percent, and the wake-up time factor may be twenty-five percent). In some examples, the weights may be set upon production of controller 8. In other examples, these weights may be adjustable by host device 4 or a user of storage device 6. In some instances, the sum of the respective weights for each of the initiator response factor, the phy availability time factor, and the wake-up time factor may be equal to one hundred percent.

After determining the respective performance value, efficiency determination module 22 may multiply the respective performance value with the scaled percentage of the performance value to determine the performance factor. As described above, the respective performance factor may be a scaled percentage of a respective performance value associated with each respective phy of the plurality of phys. The scaled percentage of the respective performance value may indicate the weight that efficiency determination module 22 places on the performance factor in evaluating which phy to select for performing the operation. For instance, if the scaled percentage of the performance factor is equal to one hundred percent, each phy of the plurality of phys 16A-16N may be in an active power mode and executing operations in parallel, enabling efficiency determination module 22 to simply select the phy that would be capable of completing the respective operation first (i.e., the phy with the largest performance factor). In other instances, the scaled percentage of the performance value may be less than one hundred percent, enabling efficiency determination module 22 to use a combination of the power factor and the performance factor in selecting the phy for performing the operation.

Based on the determined power factor and performance factor, efficiency determination module 22 may select the second phy to perform the operation indicated by the received signal. As indicated above, the respective power factor may be a scaled percentage of a respective power value associated with each respective phy of the plurality of phys, and the respective performance factor may be a scaled percentage of a respective performance value associated with each respective phy of the plurality of phys. In some examples, the sum of the scaled percentage of the power factor and the scaled percentage of the performance value is equal to one hundred percent. Further, in some examples, the second phy may be different than the first phy 16A over which the signal was received. In other examples, efficiency determination module 22 may determine that the first phy 16A is the phy for performing the operation indicated by the received signal, so the first phy may be the same phy as the determined second phy.

Once controller 8 selects second phy 16B to perform the operation, port 14 may perform, using second phy 16B, the operation associated with the received signal. In the example of FIG. 1, phy 16B may perform the operation of conducting the write operation indicated in the signal received by phy 16A.

Figure 3:
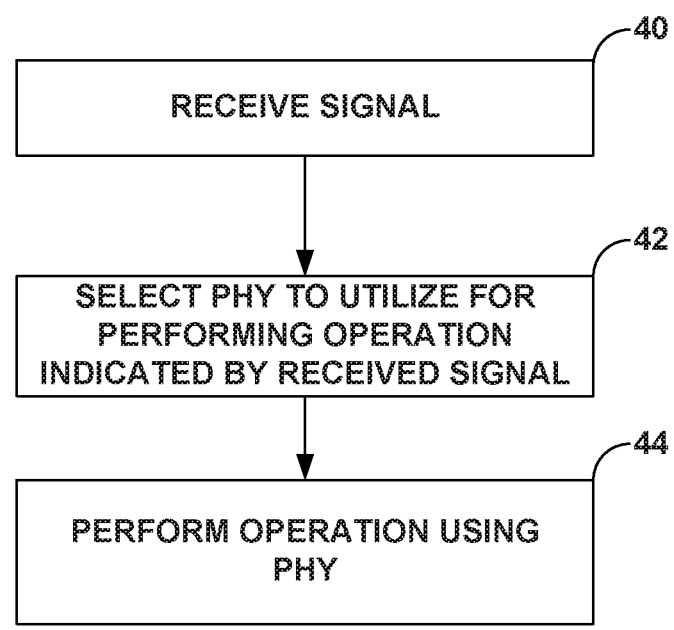
FIG. 3 is a flow diagram illustrating an example technique for a controller in handling outgoing communications to a host device, in accordance with one or more techniques of this disclosure.

FIG. 3 is a flow diagram illustrating an example technique for a controller in handling outgoing communications to a host device, in accordance with one or more techniques of this disclosure. For the purposes of illustration only, reference will be made to structures of FIG. 1 in describing the functionality performed in accordance with the techniques of this disclosure.

Techniques of this disclosure include an assignment technique performed by a controller of a hard disk drive or solid state drive to handle incoming operations from a host device, such as controller 8 of data storage device 6. Because host devices may not be aware of operation queues and power mode statuses of phys in a port on the hard disk drive or solid state drive, a phy that receives a signal from the host device may not be the most efficient phy to perform the operation indicated by the signal. As such, when a phy receives a signal, the controller of the hard disk drive or solid state drive may utilize the techniques described herein to evaluate which phy in the port may be the phy for performing the operation indicated by the signal based on an evaluation of how much power would be consumed by the phy in performing the operation and how quickly the phy would be able to perform the operation given the phy's current state and operation queue. Based on how much weight each of the power and performance factors are given, the controller may select the phy to perform the respective operation. In some examples, more weight may be given to one of the power factor or the performance factor, based on the needs of the particular hard disk drive or solid state drive. While some examples may scale the evaluation such that one hundred percent of the evaluation is based on one of the power factor or the performance factor, other examples utilize a combination of the power factor and the performance factor in evaluating the potential phys with which to perform the given operation.

In accordance with the techniques of this disclosure, port 14 may be configured to receive, via phy 16A, a signal (40). In some examples, the signal may include or be associated with an operation to be performed by one of phys 16A-16D. In the example of FIG. 1, phy 16A may receive a signal from host 4 for a request to conduct a read operation on data stored in non-volatile memory 12. Examples of the signal include a signal that includes data for writing or a signal that includes an address of data for reading, among other things. Other examples of operations that may be performed by one of phys 16A-16D include a write operation, a read operation, a data transfer, or a data deletion, among other things.

Responsive to phy 16A receiving the signal, controller 8 may select, based on a respective power factor associated with each respective phy of the plurality of phys 16A-16N and a respective performance factor associated with each respective phy of the plurality of phys 16A-16N, a second phy of the plurality of phys to utilize for performing an operation associated with the received signal (42). In the example of FIG. 3, phy 16A received a signal indicative of an operation to perform a read operation on data stored in non-volatile memory 12. As such, one phy of the phys 16A-16N may perform that operation. However, due to previously queued operations and power states of the various phys 16A-16N, the operation may more efficiently be performed on some phys of the plurality of phys 16A-16N than others. Further, based on the environment in which data storage device 6 is performing in, controller 8 may be configured to operate under various levels of power efficiency and performance efficiency. These levels may influence the values of the respective power factors and the respective performance factors.

For instance, if data storage device 6 is configured to be a low-power storage device, controller 8 may select the second phy based on which phy would require the least amount of power consumption to execute the operation indicated by the received signal. In another instance, if data storage device 6 is configured to operate in a high-traffic environment, controller 8 may select the second phy based on which phy would complete the operation the quickest. In still other instances, controller 8 may select the phy based on a combination of the power consumption and the performance efficiency. In the example of FIG. 1, controller 8 may select phy 16B to perform the data transfer included in the received signal, based on the respective power factor and the respective performance factor of phy 16B indicating that phy 16B was the phy for performing the operation under the current configuration of data storage device 6.

Based on the determined power factor and performance factor, controller 8 may select the second phy to perform the operation indicated by the received signal. As indicated above, the respective power factor may be a scaled percentage of a respective power value associated with each respective phy of the plurality phys, and the respective performance factor may be a scaled percentage of a respective performance value associated with each respective phy of the plurality of phys. In some examples, the sum of the scaled percentage of the power factor and the scaled percentage of the performance value is equal to one hundred percent. Further, in some examples, the second phy may be different than the first phy 16A over which the signal was received. In other examples, controller 8 may determine that the first phy 16A is the phy for performing the operation indicated by the received signal, so the first phy may be the same phy as the determined second phy.

Once controller 8 selects second phy 16B to perform the operation, port 14 may perform, using second phy 16B, the operation associated with the received signal (44). In the example of FIG. 1, phy 16B may perform the operation of conducting the data transfer indicated in the signal received by phy 16A.

By using the techniques described herein, data storage device 6 may intelligently decide which phy of phys 16A-16N to utilize in performing operations based on the environment in which data storage device 6 is configured to operate. As host device 4 may be generally unaware of operations being performed on data storage device 6 without querying data storage device 6, host device 4 may arbitrarily determine which phy of phys 16A-16N to utilize in sending a signal indicative of an operation to be performed to data storage device 6. If the same phy is consistently used when data storage device 6 is configured for performance, performing all operations using the same phy may result in a large loss in performance, as other phys may not execute any operations while the single phy executes each operation. In other instances, if the phy used by host device 4 to send operations to data storage device 6 is rotated when data storage device 6 is configured for power efficiency, performing each operation at the phy which the operation was received may result in power inefficiencies and performance delays based on the phys consistently being activated out of slumber mode and being switched back into slumber mode after the operation is executed. Further, if data storage device 6 was required to switch environments, the previous techniques may not allow data storage device 6 to effectively make such a switch. Using the techniques of the current disclosure, data storage device 6 may intelligently and efficiently operate under any combination of performance and power optimizations independently of host device 4. Further, data storage device 6 may alter optimization levels based on the desired environment without host device 4 needing to be aware of such changes, increasing the independence of data storage device 6.

Figure 4:
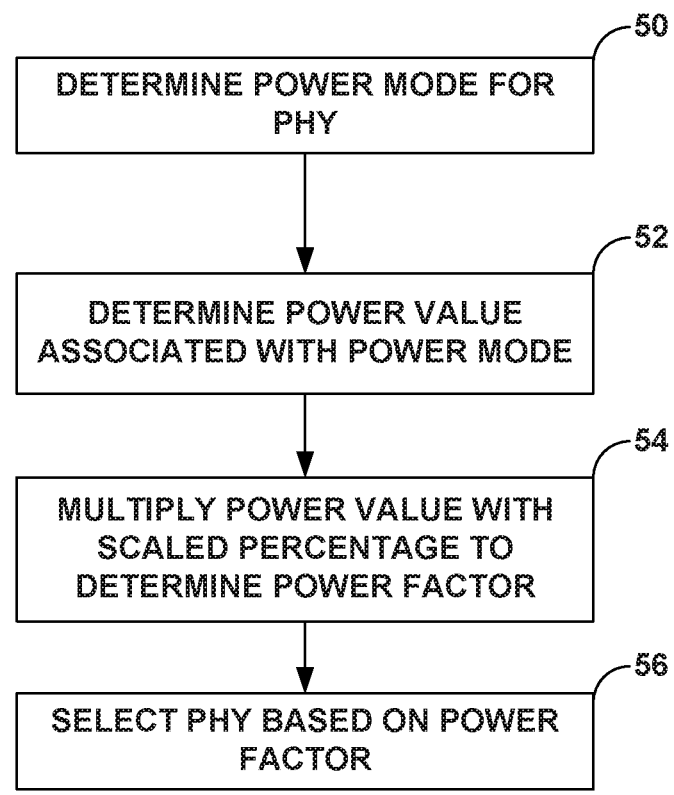
FIG. 4 is a flow diagram illustrating an example technique for a controller in determining a power factor for a respective phy, in accordance with one or more techniques of this disclosure.

FIG. 4 is a flow diagram illustrating an example technique for a controller in determining a power factor for a respective phy, in accordance with one or more techniques of this disclosure. For the purposes of illustration only, reference will be made to structures of FIG. 1 in describing the functionality performed in accordance with the techniques of this disclosure.

In determining the respective power factor for each respective phy, the controller is essentially evaluating the power consumption necessary for each respective phy to perform the operation indicated by the received signal. In some environments, such as those with limited power supplies or with high temperatures, the hard disk drive or solid state drive may benefit from operating with as little power consumed as possible. As such, the controller may evaluate the amount of power that would be consumed by each phy in performing the operation, including the power necessary to place the phy in a state in which it may perform various operations (e.g., activating the phy from a slumber mode). In some examples, the controller may strictly select the phy based on which phy would consume the least amount of power. In other words, disregarding the performance factor, the controller may select the phy that would require the least amount of additional power to perform the operation indicated by the received signal. In other examples, the controller may use power consumption as a partial factor in selecting the operation-performing phy, scaling the power factor and adding the scaled power factor to a scaled performance factor.

In some examples, the respective power factor indicates an inverse level of power consumption needed to perform the operation using the respective phy. The respective power factor may be a scaled percentage of a respective power value associated with each respective phy of the plurality of phys.

In determining the respective power factor for each respective phy 16A-16N, controller 8 may determine a power mode for the respective phy (50). In some examples, the power mode may be one of an active mode, a slumber mode, or a partial power mode. For instance, if phy 16A is in an active mode, phy 16A may be powered to actively receive signals and perform the operations included in the signals. In other instances, if phy 16A is in slumber mode, phy 16A may neither receive signals from the host device nor perform operations and requires a first wake-up time duration to be transitioned to the active mode. In still other instances, if phy 16A is in partial power mode, phy 16A may neither receive signals from the host device nor perform operations and that the respective phy requires a second wake-up time duration to be transitioned to the active mode, wherein the second wake-up time duration is less than the first wake-up time duration. For example, a phy in slumber mode or partial power mode may only be able to receive signals from controller 8 that indicate that the respective phy should transition to active mode. The time duration that the transition takes, in addition to the power needed to make such a transition, may take a longer time and require more power when the phy is in slumber mode rather than partial power mode. As a tradeoff, a phy in slumber mode may consume less power than a phy in partial power mode. In other examples, other power modes may exist, with each power mode supplying different amounts of power to the respective phy.

In other words, in order for phy 16A to be switched to an active mode such that phy 16A is capable of performing operations, different amounts of power may be required. For instance, if phy 164 is already in active mode, a minimal amount of power may be needed to switch phy 16A into a state where phy 16A may perform the operation indicated by the received signal. Conversely, if phy 16A is in slumber mode and receiving a very low amount of power, a larger amount of power may be needed to switch phy 16A into a state where phy 16A may perform the operation indicated by the received signal.

Based on the power mode for the respective phy, controller 8 may determine a power value for the respective phy (52). For instance, since the power factor indicates an inverse level of power consumption needed to perform the operation using the respective phy, larger power values may be assigned to phys with power modes that require less power consumption to perform the operation. As such, controller 8 may assign phys in active mode a high value (e.g., one), phys in slumber mode a low value (e.g., zero), and phys in a partial power mode a middle value (e.g., zero<power value<one).

Controller 8 may then multiply the power value with the scaled percentage of the respective power value associated with the respective phy to determine the power factor associated with the respective phy (54). As described above, the respective power factor may be a scaled percentage of a respective power value associated with each respective phy of the plurality of phys. The scaled percentage of the respective power value may indicate the weight that controller 8 places on the power factor in evaluating which phy to select for performing the operation. For instance, if the scaled percentage of the power factor is equal to one hundred percent, controller 8 may always select the phy that would consume the least amount of power in performing the operation, i.e., the phy with the largest power factor. In such instances, only a single phy may be in active mode, with all signals being received by the single active phy and all operations being performed by the single active phy. In other instances, the scaled percentage of the power value may be less than one hundred percent, enabling controller 8 to use a combination of the power factor and the performance factor in selecting the phy for performing the operation.

Based on the respective power factors for each respective phy, controller 8 may select the second phy with which port 14 may perform the operation included in the received signal (56). For example, controller 8 may select the phy with the largest respective power factor. In other examples, controller 8 may select the phy with the largest sum of the phy's respective power factor and the phy's respective performance factor.

Figure 5:
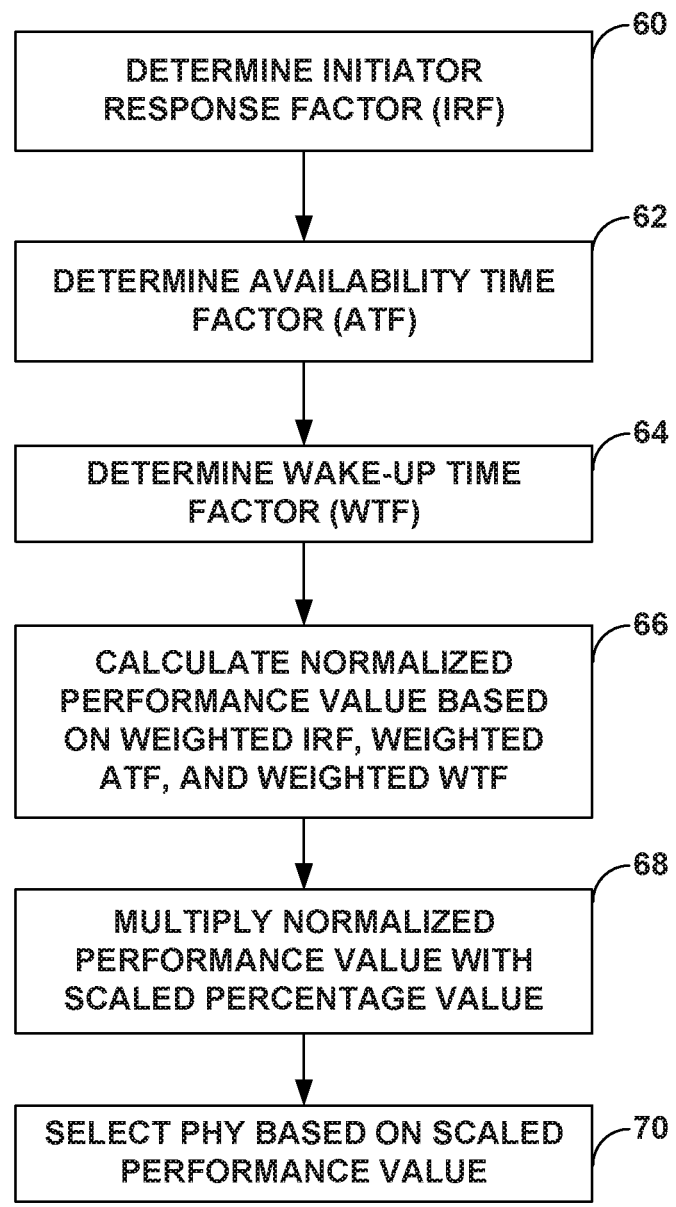
FIG. 5 is a flow diagram illustrating an example technique for a controller in determining a performance factor for a respective phy, in accordance with one or more techniques of this disclosure.

FIG. 5 is a flow diagram illustrating an example technique for a controller in determining a performance factor for a respective phy, in accordance with one or more techniques of this disclosure. For the purposes of illustration only, reference will be made to structures of FIG. 1 in describing the functionality performed in accordance with the techniques of this disclosure.

In determining the respective performance factor for each respective phy, the controller is essentially evaluating how quickly each respective phy could perform the operation indicated by the received signal to completion. In some environments, such as drives on server devices or shared hard disk drives, the hard disk drive may benefit from operating with as much parallel activity as possible amongst the multiple phys. As such, the controller may evaluate the various factors that contribute to how quickly each phy may be able to address the operation indicated by the received signal, including the number of operations already in the respective phy's queue, how long it would take to place the phy in a state to be able to perform the operation, and how long the operation itself would take. In some examples, the controller may strictly select the phy based on which phy could complete the operation quickest. In other words, disregarding the power factor, the controller may select the phy that would complete the performance of the operation indicated by the received signal in the least amount of time. In other examples, the controller may additionally use power consumption as a partial factor in selecting the operation-performing phy, scaling the performance factor and adding the scaled performance factor to a scaled power factor.

In some examples, the respective performance factor indicates a relative amount of time needed to perform the operation using the respective phy. The respective performance factor may include a scaled percentage of a respective performance value associated with each respective phy of the plurality of phys.

In determining the respective performance factor for each respective phy 16A-16N, controller 8 may determine an initiator response factor for the respective phy (60). The initiator response factor may indicate a level of an initiator time turnaround for the respective phy, which may be based on an internal response histogram. Using command latency monitoring hardware, firmware in controller 8 may maintain active response time histograms for each initiator on each phy. Separate statistics are maintained for read and write directions. For reads, a histogram may track time from the first open request to when credit is granted. For writes, a histogram may track time from the open request for a transfer ready frame to host 4 returning the first write data frame. The respective histograms may be determined from running short-term statistics of the last n commands of the same type (e.g., n=100,000). As such, the initiator response factor may be a value from zero to one based on a probability of being in the specific histogram grouping where one is a grouping with the lowest response times and zero is a grouping with the largest response times.

Controller 8 may then determine a phy availability time factor for the respective phy (62). The phy availability time factor may indicate a level of time for the respective phy to become available to process a new operation based on the expected processing times of pending operations in a queue to be processed by the respective phy. Using the command latency monitoring hardware, the firmware of controller 8 may maintain command response time statistics. Controller 8 may calculate an expected time before each phy would be available to service a new command by summing the expected completion time for all pending commands in each phy's queue based on the individual command lengths and internal response time statistics. As such, the phy availability factor may be a value from zero to one based on the total expected time until the respective phy would be available for performing the new operation, where 0 is worst case time (e.g. >25 ms) and 1 is best case where the respective phy is immediately available (e.g. no pending operations).

Controller 8 may then determine a wake-up time factor for the respective phy (64). The wake-up time factor may indicate a level of time for the respective phy to switch to an active power mode, similar to the power factor. The phy wake-up time factor may be a value from zero to one, where one means the phy is already active no wake-up delay), zero means the phy is in slumber mode (i.e., the worst case wake-up delay), and a relative value based on wake-up time between 0 and 1 for a phy in a partial power mode.

Controller 8 may determine the respective performance value for the respective phy based on the initiator response factor for the respective phy, the phy availability time factor for the respective phy, the wake-up time factor for the respective phy, and a respective weight for each of the initiator response factor, the phy availability time factor, and the wake-up time factor (66). Each of the initiator response factor, the phy availability time factor, and the wake-up time factor may influence the performance of the phy in various ways. As such, different implementations may assign different weights to each of the factors. In some examples, each factor may have an equal weight (i.e., 33.3%). In other examples, the factors may have different weights (e.g., the initiator response factor weight=50%, the phy availability time factor=25%, and the wake-up time factor=25%). In some examples, the weights may be set upon production of controller 8. In other examples, these weights may be adjustable by host device 4 or a user of storage device 6. In some instances, the sum of the respective weights for each of the initiator response factor, the phy availability time factor, and the wake-up time factor may be equal to one hundred percent.

After determining the respective performance value, controller 8 may multiply the respective performance value with the scaled percentage of the performance value to determine the performance factor (68). As described above, the respective performance factor may be a scaled percentage of a respective performance value associated with each respective phy of the plurality of phys. The scaled percentage of the respective performance value may indicate the weight that controller 8 places on the performance factor in evaluating which phy to select for performing the operation. For instance, if the scaled percentage of the performance factor is equal to one hundred percent, each phy of the plurality of phys 16A-16N may be in an active power mode and executing operations in parallel, enabling controller 8 to simply select the phy that would be capable of completing the respective operation first (i.e., the phy with the largest performance factor). In other instances, the scaled percentage of the performance value may be less than one hundred percent, enabling controller 8 to use a combination of the power factor and the performance factor in selecting the phy for performing the operation.

Based on the respective performance factors for each respective phy, controller 8 may select the second phy with which port 14 may perform the operation included in the received signal (70). For example, controller 8 may select the phy with the largest respective performance factor. In other examples, controller 8 may select the phy with the largest sum of the phy's respective power factor and the phy's respective performance factor.

Example 1

A method comprising: receiving, at a wide port of a storage device, via a first phy of a plurality of phys associated the wide port, a signal; selecting, by a controller of the storage device, based on a respective power factor associated with each respective phy of the plurality of phys and a respective performance factor associated with each respective phy of the plurality of phys, a second phy of the plurality of phys to utilize for performing an operation associated with the received signal; and performing, by the wide port, using the second phy, the operation associated with the received signal.

Example 2

The method of example 1, wherein the respective power factor indicates an inverse level of power consumption needed to perform the operation using the respective phy.

Example 3

The method of any of examples 1-2, wherein the respective performance factor indicates a relative amount of time needed to perform the operation using the respective phy.

Example 4

The method of any of examples 1-2, wherein the respective power factor comprises a scaled percentage of a respective power value associated with each respective phy of the plurality phys, and wherein the respective performance factor comprises a scaled percentage of a respective performance value associated with each respective phy of the plurality of phys.

Example 5

The method of example 4, further comprising: for each phy of the plurality of phys: determining, by the controller, a power mode for the respective phy; determining, by the controller and based on the power mode, the power value for the respective phy; and multiplying, by the controller, the power value with the scaled percentage of the respective power value associated with the respective phy to determine the power factor associated with the respective phy; and selecting, by the controller and based on the respective power factor associated with each of the respective phys, the second phy.

Example 6

The method of example 5, wherein, when the scaled percentage of the power factor is equal to one hundred percent, the first phy comprises the same phy as the second phy, and only the second phy of the plurality of phys is active.

Example 7

The method of any of examples 5-6, wherein the second phy comprises the phy of the plurality of phys with the largest power factor.

Example 8

The method of any of examples 5-7, wherein the power mode is one of an active mode, a slumber mode, or a partial power mode, wherein the active mode indicates that the respective phy may receive signals from a host device and perform operations, wherein the slumber mode indicates that the respective phy may neither receive signals from the host device nor perform operations and that the respective phy requires a first wake-up time duration to be transitioned to the active mode, and wherein the partial power mode indicates that the respective phy may neither receive signals from the host device nor perform operations and that the respective phy requires a second wake-up time duration to be transitioned to the active mode, wherein the second wake-up time duration is less than the first wake-up time duration

Example 9

The method of any of examples 4-8, further comprising: for each phy of the plurality of phys: determining, by the controller, an initiator response factor for the respective phy, wherein the initiator response factor indicates a level of an initiator turnaround time for the respective phy; determining, by the controller, a phy availability time factor for the respective phy, wherein the phy availability time factor indicates a level of time for the respective phy to become available to process a new operation based on the expected processing times of pending operations in a queue to be processed by the respective phy; determining, by the controller, a wake-up time factor for the respective phy, wherein the wake-up time factor indicates a level of time for the respective phy to switch to an active power mode; determining, by the controller, based on the initiator response factor for the respective phy, the phy availability time factor for the respective phy, the wake-up time factor for the respective phy, and a respective weight for each of the initiator response factor, the phy availability time factor, and the wake-up time factor, the respective performance value for the respective phy; and multiplying, by the controller, the respective performance value with the scaled percentage of the performance value to determine the performance factor; and selecting, by the controller, based on the respective performance factors, the second phy.

Example 10

The method of example 9, wherein, when the scaled percentage of the performance value is equal to one hundred percent, each phy of the plurality phys is in an active power mode and executing in parallel.

Example 11

The method of any of examples 9-10, wherein the second phy comprises the phy of the plurality of phys with the largest performance factor.

Example 12

The method of any of examples 9-10, wherein a sum of the respective weights for each of the initiator response factor, the phy availability time factor, and the wake-up time factor is equal to one hundred percent.

Example 13

The method of any of examples 4-12, wherein a sum of the scaled percentage of the power factor and the scaled percentage of the performance value is equal to one hundred percent.

Example 14

The method of any of examples 1-13, wherein the second phy is different than the first phy.

Example 15

A storage device comprising: a wide port comprising a plurality of phys, wherein the wide port is configured to: receive, via a first phy of the plurality of phys, a signal; and a controller configured to: select, based on a respective power factor associated with each respective phy of the plurality of phys and a respective performance factor associated with each respective phy of the plurality of phys, a second phy of the plurality of phys to utilize for performing an operation associated with the received signal, wherein the wide port is further configured to perform, using the second phy, the operation associated with the received signal.

Example 16

The storage device of example 15, wherein the respective power factor indicates an inverse level of power consumption needed to perform the operation using the respective phy, and wherein the respective performance factor indicates a relative amount of time needed to perform the operation using the respective phy.

Example 17

The storage device of any of examples 15-16, wherein the respective power factor comprises a scaled percentage of a respective power value associated with each respective phy of the plurality phys, and wherein the respective performance factor comprises a scaled percentage of a respective performance value associated with each respective phy of the plurality of phys.

Example 18

The storage device of example 17, wherein the controller is further configured to: for each phy of the plurality of phys: determining, by the controller, a power mode for the respective phy; determining, by the controller and based on the power mode, the power value for the respective phy; and multiplying, by the controller, the power value with the scaled percentage of the respective power value associated with the respective phy to determine the power factor associated with the respective phy; and selecting, by the controller and based on the respective power factor associated with each of the respective phys, the second phy, wherein the second phy comprises the phy of the plurality of phys with the largest power factor, and wherein the power mode is one of an active mode, a slumber mode, or a partial power mode, wherein the active mode indicates that the respective phy may receive signals from a host device and perform operations, wherein the slumber mode indicates that the respective phy may neither receive signals from the host device nor perform operations and that the respective phy requires a first wake-up time duration to be transitioned to the active mode, and wherein the partial power mode indicates that the respective phy may neither receive signals from the host device nor perform operations and that the respective phy requires a second wake-up time duration to be transitioned to the active mode, wherein the second wake-up time duration is less than the first wake-up time duration.

Example 19

The storage device of any of examples 17-18, wherein the controller is further configured to: for each phy of the plurality of phys: determining, by the controller, an initiator response factor for the respective phy, wherein the initiator response factor indicates a level of an initiator turnaround time for the respective phy, determining, by the controller, a phy availability time factor for the respective phy, wherein the phy availability time factor indicates a level of time for the respective phy to become available to process a new operation based on the expected processing times of pending operations in a queue to be processed by the respective phy; determining, by the controller, a wake-up time factor for the respective phy, wherein the wake-up time factor indicates a level of time for the respective phy to switch to an active power mode; determining, by the controller, based on the initiator response factor for the respective phy, the phy availability time factor for the respective phy, the wake-up time factor for the respective phy, and a respective weight for each of the initiator response factor, the phy availability time factor, and the wake-up time factor, the respective performance value for the respective phy; and multiplying, by the controller, the respective performance value with the scaled percentage of the performance value to determine the performance factor associated with the respective phy; and selecting, by the controller, based on the respective performance factors, the second phy, wherein the second phy comprises the phy of the plurality of phys with the largest performance factor, and wherein a sum of the respective weights for each of the initiator response factor, the phy availability time factor, and the wake-up time factor is equal to one hundred percent.

Example 20

A computer-readable medium containing instructions that, when executed, cause a controller of a storage device to: responsive to receiving, at a wide port of a storage device, via a first phy of a plurality of phys associated the wide port, a signal: for each phy of the plurality of phys: determine a power mode for the respective phy; determine, based on the power mode, a power value for the respective phy; and multiply the power value with a scaled percentage of the respective power value associated with the respective phy to determine a power factor associated with the respective phy; determining, by the controller, an initiator response factor for the respective phy, wherein the initiator response factor indicates a level of an initiator turnaround time for the respective phy; determine a phy availability time factor for the respective phy, wherein the phy availability time factor indicates a level of time for the respective phy to become available to process a new operation based on the expected processing times of pending operations in a queue to be processed by the respective phy; determine a wake-up time factor for the respective phy, wherein the wake-up time factor indicates a level of time for the respective phy to switch to an active power mode; determine, based on the initiator response factor for the respective phy, the phy availability time factor for the respective phy, the wake-up time factor for the respective phy, and a respective weight for each of the initiator response factor, the phy availability time factor, and the wake-up time factor, a respective performance value for the respective phy; and multiply the respective performance value with a scaled percentage of the performance value to determine a performance factor associated with the respective phy; select, based on the respective power factor associated with each respective phy of the plurality of phys and the respective performance factor associated with each respective phy of the plurality of phys, a second phy of the plurality of phys to utilize for performing an operation associated with the received signal; and perform, using the second phy, the operation associated with the received signal.

Example 21

A device comprising means for performing the method of any combination of examples 1-14.

Example 22

A computer-readable storage medium encoded with instructions that, when executed, cause at least one processor of a computing device to perform the method of any combination of examples 1-14.

Example 23

A device comprising at least one module operable by one or more processors to perform the method of any combination of examples 1-14.

The techniques described in this disclosure may be implemented, at least in part, in hardware, software, firmware, or any combination thereof. For example, various aspects of the described techniques may be implemented within one or more processing units, including one or more microprocessing units, digital signal processing units (DSPs), application specific integrated circuits (ASICs), field programmable gate arrays (FPGAs), or any other equivalent integrated or discrete logic circuitry, as well as any combinations of such components. The term "processing unit" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processing units, or other processing units, to implement one or more of the techniques described herein, such as when instructions included or encoded in the computer-readable storage medium are executed by the one or more processing units. Computer readable storage media may include random access memory (RAM), read only memory (ROM), programmable read only memory (PROM), erasable programmable read only memory (EPROM), electrically erasable programmable read only memory (EEPROM), flash memory, a hard disk, a compact disk ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change in RAM or cache).

Various examples of the disclosure have been described. Any combination of the described systems, operations, or functions is contemplated. These and other examples are within the scope of the following claims.

The invention claimed is:

1. A method comprising:
receiving, at a wide port of a storage device, via a first phy of a plurality of phys associated with the wide port, a signal;
selecting, by a controller of the storage device, based on a respective power factor associated with each respective phy of the plurality of phys and a respective performance factor associated with each respective phy of the plurality of phys, a second phy of the plurality of phys to utilize one of a wake up time factor associated with the received signal and a respective weight associated with the received signal; and
performing, by the wide port, using the second phy, the operation associated with the received signal.

2. The method of claim 1, wherein the respective power factor indicates an inverse level of power consumption needed to perform the operation using the respective phy.

3. The method of claim 1, wherein the respective performance factor indicates a relative amount of time needed to perform the operation using the respective phy.

4. The method of claim 1, wherein the second phy is different than the first phy.

5. A method comprising:
receiving, at a wide port of a storage device, via a first phy of a plurality of phys associated with the wide port, a signal;
selecting, by a controller of the storage device, based on a respective power factor associated with each respective phy of the plurality of phys and a respective performance factor associated with each respective phy of the plurality of phys, a second phy of the plurality of phys to utilize for performing an operation associated with the received signal; and
performing, by the wide port, using the second phy, the operation associated with the received signal, wherein the respective power factor comprises a scaled percentage of a respective power value associated with each respective phy of the plurality of phys, and wherein the respective performance factor comprises a scaled percentage of a respective performance value associated with each respective phy of the plurality of phys.

6. The method of claim 5, further comprising:
for each phy of the plurality of phys:
determining, by the controller, a power mode for the respective phy;
determining, by the controller and based on the power mode, the power value for the respective phy; and
multiplying, by the controller, the power value with the scaled percentage of the respective power value associated with the respective phy to determine the power factor associated with the respective phy; and
selecting, by the controller and based on the respective power factor associated with each of the respective phys, the second phy.

7. The method of claim 6, wherein, when the scaled percentage of the power factor is equal to one hundred percent, the first phy comprises the same phy as the second phy, and only the second phy of the plurality of phys is active.

8. The method of claim 6, wherein the second phy comprises the phy of the plurality of phys with the largest power factor.

9. The method of claim 6, wherein the power mode is one of an active mode, a slumber mode, or a partial power mode, wherein the active mode indicates that the respective phy may receive signals from a host device and perform operations, wherein the slumber mode indicates that the respective phy may neither receive signals from the host device nor perform operations and that the respective phy requires a first wake-up time duration to be transitioned to the active mode, and wherein the partial power mode indicates that the respective phy may neither receive signals from the host device nor perform operations and that the respective phy requires a second wake-up time duration to be transitioned to the active mode, wherein the second wake-up time duration is less than the first wake-up time duration.

10. The method of claim 5, further comprising:
for each phy of the plurality of phys:
determining, by the controller, an initiator response factor for the respective phy, wherein the initiator response factor indicates a level of an initiator turn-around time for the respective phy;
determining, by the controller, a phy availability time factor for the respective phy, wherein the phy availability time factor indicates a level of time for the respective phy to become available to process a new operation based on the expected processing times of pending operations in a queue to be processed by the respective phy;
determining, by the controller, a wake-up time factor for the respective phy, wherein the wake-up time factor indicates a level of time for the respective phy to switch to an active power mode;
determining, by the controller, based on the initiator response factor for the respective phy, the phy availability time factor for the respective phy, the wake-up time factor for the respective phy, and a respective weight for each of the initiator response factor, the phy availability time factor, and the wake-up time factor, the respective performance value for the respective phy; and
multiplying, by the controller, the respective performance value with the scaled percentage of the performance value to determine the performance factor; and
selecting, by the controller, based on the respective performance factors, the second phy.

11. The method of claim 10, wherein, when the scaled percentage of the performance value is equal to one hundred percent, each phy of the plurality of phys is in an active power mode and executing in parallel.

12. The method of claim 10, wherein the second phy comprises the phy of the plurality of phys with the largest performance factor.

13. The method of claim 10, wherein a sum of the respective weights for each of the initiator response factor, the phy availability time factor, and the wake-up time factor is equal to one hundred percent.

14. The method of claim 5, wherein a sum of the scaled percentage of the power factor and the scaled percentage of the performance value is equal to one hundred percent.

15. A storage device comprising:
a wide port comprising a plurality of phys, wherein the wide port is configured to:
receive, via a first phy of the plurality of phys, a signal; and
a controller configured to:
select, based on a respective power factor associated with each respective phy of the plurality of phys and a respective performance factor associated with each respective phy of the plurality of phys, a second phy of the plurality of phys to utilize one of a wake up time factor associated with the received signal and a respective weight associated with the received signal, wherein the wide port is further configured to perform, using the second phy, the operation associated with the received signal.

16. The storage device of claim 15, wherein the respective power factor indicates an inverse level of power consumption needed to perform the operation using the respective phy, and wherein the respective performance factor indicates a relative amount of time needed to perform the operation using the respective phy.

17. A storage device comprising:
a wide port comprising a plurality of phys, wherein the wide port is configured to:
receive, via a first phy of the plurality of phys, a signal; and a controller configured to:
select, based on a respective power factor associated with each respective phy of the plurality of phys and a respective performance factor associated with each respective phy of the plurality of phys, a second phy of the plurality of phys to utilize for performing an operation associated with the received signal,
wherein the wide port is further configured to perform, using the second phy, the operation associated with the received signal, wherein the respective power factor comprises a scaled percentage of a respective power value associated with each respective phy of the plurality of phys, and wherein the respective performance factor comprises a scaled percentage of a respective performance value associated with each respective phy of the plurality of phys.

18. The storage device of claim 17, wherein the controller is further configured to:
for each phy of the plurality of phys:
determining, by the controller, a power mode for the respective phy;
determining, by the controller and based on the power mode, the power value for the respective phy; and
multiplying, by the controller, the power value with the scaled percentage of the respective power value associated with the respective phy to determine the power factor associated with the respective phy; and
selecting, by the controller and based on the respective power factor associated with each of the respective phys, the second phy,
wherein the second phy comprises the phy of the plurality of phys with the largest power factor, and
wherein the power mode is one of an active mode, a slumber mode, or a partial power mode, wherein the active mode indicates that the respective phy may receive signals from a host device and perform operations, wherein the slumber mode indicates that the respective phy may neither receive signals from the host device nor perform operations and that the respective phy requires a first wake-up time duration to be transitioned to the active mode, and wherein the partial power mode indicates that the respective phy may neither receive signals from the host device nor perform operations and that the respective phy requires a second wake-up time duration to be transitioned to the active mode, wherein the second wake-up time duration is less than the first wake-up time duration.

19. The storage device of claim 17, wherein the controller is further configured to:

for each phy of the plurality of phys:
determining, by the controller, an initiator response factor for the respective phy, wherein the initiator response factor indicates a level of an initiator turnaround time for the respective phy;
determining, by the controller, a phy availability time factor for the respective phy, wherein the phy availability time factor indicates a level of time for the respective phy to become available to process a new operation based on the expected processing times of pending operations in a queue to be processed by the respective phy;
determining, by the controller, a wake-up time factor for the respective phy, wherein the wake-up time factor indicates a level of time for the respective phy to switch to an active power mode;
determining, by the controller, based on the initiator response factor for the respective phy, the phy availability time factor for the respective phy, the wake-up time factor for the respective phy, and a respective weight for each of the initiator response factor, the phy availability time factor, and the wake-up time factor, the respective performance value for the respective phy; and
multiplying, by the controller, the respective performance value with the scaled percentage of the performance value to determine the performance factor associated with the respective phy; and
selecting, by the controller, based on the respective performance factors, the second phy,
wherein the second phy comprises the phy of the plurality of phys with the largest performance factor, and
wherein a sum of the respective weights for each of the initiator response factor, the phy availability time factor, and the wake-up time factor is equal to one hundred percent.

20. A non-transitory computer-readable medium containing instructions that, when executed, cause a controller of a storage device to:
responsive to receiving, at a wide port of a storage device, via a first phy of a plurality of phys associated with the wide port, a signal:
for each phy of the plurality of phys:
determine a power mode for the respective phy;
determine, based on the power mode, a power value for the respective phy;
multiply the power value with a scaled percentage of the respective power value associated with the respective phy to determine a power factor associated with the respective phy;
determining, by the controller, an initiator response factor for the respective phy, wherein the initiator response factor indicates a level of an initiator time turnaround for the respective phy;
determine a phy availability time factor for the respective phy, wherein the phy availability time factor indicates a level of time for the respective phy to become available to process a new operation based on the expected processing times of pending operations in a queue to be processed by the respective phy;
determine a wake-up time factor for the respective phy, wherein the wake-up time factor indicates a level of time for the respective phy to switch to an active power mode;
determine, based on the initiator response factor for the respective phy, the phy availability time factor for the respective phy, the wake-up time factor for the respective phy, and a respective weight for each of the initiator response factor, the phy availability time factor, and the wake-up time factor, a respective performance value for the respective phy; and multiply the respective performance value with a scaled percentage of the performance value to determine a performance factor associated with the respective phy;

select, based on the respective power factor associated with each respective phy of the plurality of phys and the respective performance factor associated with each respective phy of the plurality of phys, a second phy of the plurality of phys to utilize for performing an operation associated with the received signal; and perform, using the second phy, the operation associated with the received signal.

\* \* \* \* \*